US012619977B2

(12) United States Patent
Spector et al.

(10) Patent No.: US 12,619,977 B2
(45) Date of Patent: *May 5, 2026

(54) SYSTEMS AND METHODS FOR USING A CRYPTOGRAM LOCKBOX

(71) Applicant: JPMORGAN CHASE BANK, N.A., New York, NY (US)

(72) Inventors: Howard Spector, Woolwich, NJ (US); Eric L. Connolly, Avondale, PA (US); David Christopher Carey, Middletown, DE (US); Gayathri Sundar, Irving, TX (US); Raghuram Vudathu, Downington, PA (US); Ankur Kulshreshtha, Newark, DE (US); Ishank Paharia, Newark, DE (US); Pavan Mummareddi, Newark, DE (US); Benjamin Brandt, Philadelphia, PA (US); Mervin Majella Felix, Newark, DE (US); Ajith Chandran Karuvathil, West Chester, PA (US); Arun Neelan, Chadds Ford, PA (US); Rajeeva Chandra Nagarakanti, Chadds Ford, PA (US); Venkata Kunam, Newark, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 18/642,241

(22) Filed: Apr. 22, 2024

(65) Prior Publication Data

US 2024/0273517 A1 Aug. 15, 2024

Related U.S. Application Data

(63) Continuation of application No. 16/432,623, filed on Jun. 5, 2019, now Pat. No. 12,008,548.

(Continued)

(51) Int. Cl.
| G06Q 20/36 | (2012.01) |
| G06Q 20/32 | (2012.01) |
(Continued)

(52) U.S. Cl.
CPC ....... G06Q 20/3674 (2013.01); G06Q 20/322 (2013.01); G06Q 20/385 (2013.01);
(Continued)

(58) Field of Classification Search
None
See application file for complete search history.

(56) References Cited

U.S. PATENT DOCUMENTS

| 6,415,386 B1 | 7/2002 | Shi et al. |
| 7,357,309 B2 * | 4/2008 | Ghosh ................ G06Q 30/0601 |
| | | 705/41 |

(Continued)

FOREIGN PATENT DOCUMENTS

| AU | 2005266964 | 2/2006 |
| CA | 2919199 | 1/2015 |

(Continued)

OTHER PUBLICATIONS

Abdulridha, M. A., "Online Security Protocols for NFC Mobile Payment Applications", Princess Sumaya University for Technology, Jan. 2017. (Year: 2017).*

(Continued)

*Primary Examiner* — Clay C Lee
(74) *Attorney, Agent, or Firm* — GREENBERG TRAURIG LLP

(57) ABSTRACT

Systems and methods for using a cryptogram lockbox are disclosed. In one embodiment, in a merchant-specific cryptogram lockbox comprising at least one computer processor, a method for generating a cryptogram locally using a cryptogram lockbox may include: (1) receiving, from mer- (Continued)

chant backend, a request for a cryptogram comprising an account identifier received from a customer in a transaction; (2) generating a cryptogram for the account identifier using a limited use key for the account identifier; and (3) returning the cryptogram to the merchant backend. The merchant may conduct the transaction using the cryptogram.

14 Claims, 7 Drawing Sheets

Related U.S. Application Data

(60) Provisional application No. 62/680,674, filed on Jun. 5, 2018.

(51) Int. Cl.

| | | |
|---|---|---|
| *G06Q 20/38* | (2012.01) | |
| *G06Q 20/40* | (2012.01) | |
| *H04L 9/08* | (2006.01) | |
| *H04L 9/32* | (2006.01) | |

(52) U.S. Cl.
    CPC ....... *G06Q 20/4097* (2013.01); *H04L 9/0891* (2013.01); *H04L 9/3247* (2013.01); *H04L 9/3263* (2013.01)

(56) References Cited

U.S. PATENT DOCUMENTS

| | | | |
|---|---|---|---|
| 9,160,724 | B2 | 10/2015 | Rathod et al. |
| 2002/0138740 | A1 | 9/2002 | Rumble |
| 2002/0159588 | A1 | 10/2002 | Kauffman et al. |
| 2005/0033688 | A1 | 2/2005 | Peart et al. |
| 2005/0156026 | A1 | 7/2005 | Ghosh et al. |
| 2012/0124646 | A1* | 5/2012 | Lin ........................ G06Q 20/12 |
| | | | 726/3 |
| 2013/0219176 | A1 | 8/2013 | Akella et al. |
| 2015/0215297 | A1 | 7/2015 | Rathod et al. |
| 2016/0020906 | A1 | 1/2016 | Nolte et al. |
| 2016/0218875 | A1 | 7/2016 | Le Saint et al. |
| 2016/0381010 | A1 | 12/2016 | Bhandari et al. |
| 2017/0244677 | A1 | 8/2017 | Lee et al. |
| 2017/0373852 | A1 | 12/2017 | Cassin et al. |
| 2018/0137505 | A1 | 5/2018 | Soppitt et al. |
| 2018/0341937 | A1 | 11/2018 | Kim et al. |
| 2019/0188694 | A1* | 6/2019 | Uppalapati ............ G06Q 20/12 |
| 2019/0311363 | A1* | 10/2019 | Gleeson ................ G06Q 20/02 |
| 2022/0019995 | A1 | 1/2022 | Ngo et al. |

FOREIGN PATENT DOCUMENTS

| | | | |
|---|---|---|---|
| WO | 2015031184 | 3/2015 | |
| WO | 2018011630 | 1/2018 | |
| WO | WO-2018011630 A1 * | 1/2018 | ............ H04W 12/04 |

OTHER PUBLICATIONS

International Search Report and Written Opinion of the International Searching Authority, dated Oct. 11, 2019, from corresponding International Application No. PCT/US2019/035604.

Partial European Search Report, dated Feb. 22, 2022, from corresponding European Patent Application No. 19814631.8.

Extended European Search Report, dated Jun. 21, 2022, from corresponding European Patent Application No. 19814631.8.

Abdulridha, M. A, "Online Security Protocols for NFC Mobile Payment Applications", ProQuest Dissertations Publishing. (2017) ( Year: 2017).

* cited by examiner

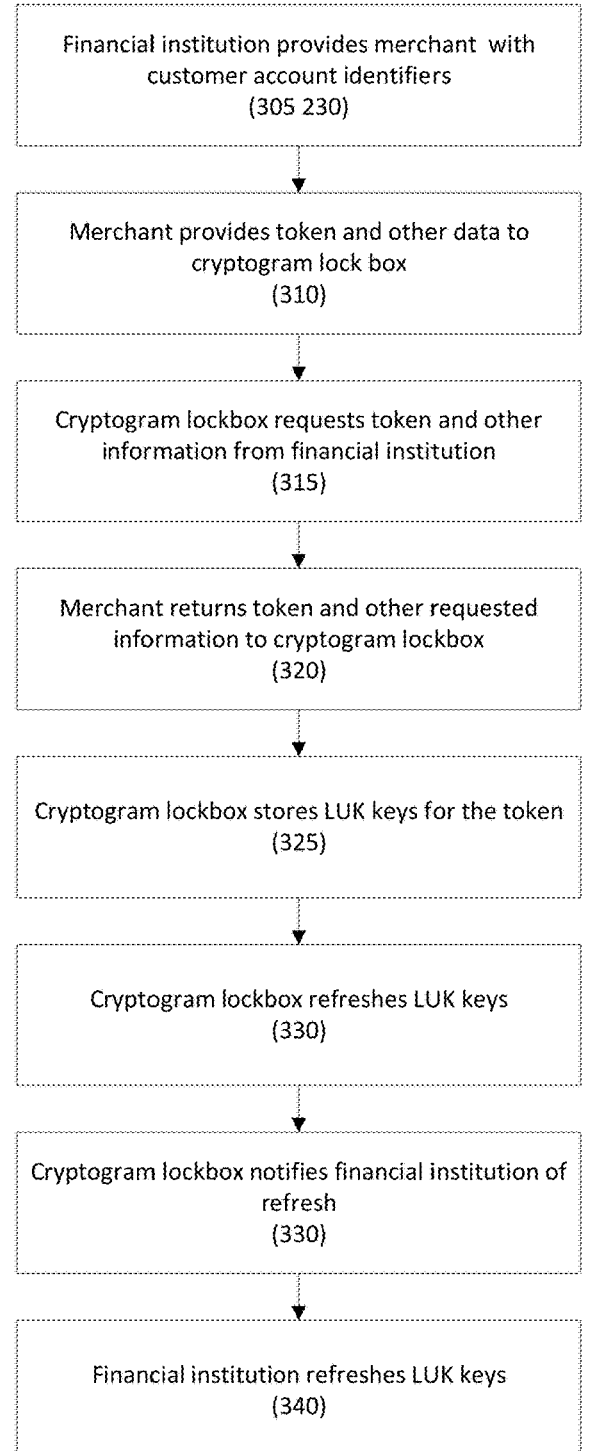

Financial institution provides merchant with
customer account identifiers
(305 230)

Merchant provides token and other data to
cryptogram lock box
(310)

Cryptogram lockbox requests token and other
information from financial institution
(315)

Merchant returns token and other requested
information to cryptogram lockbox
(320)

Cryptogram lockbox stores LUK keys for the token
(325)

Cryptogram lockbox refreshes LUK keys
(330)

Cryptogram lockbox notifies financial institution of
refresh
(330)

Financial institution refreshes LUK keys
(340)

FIGURE 3

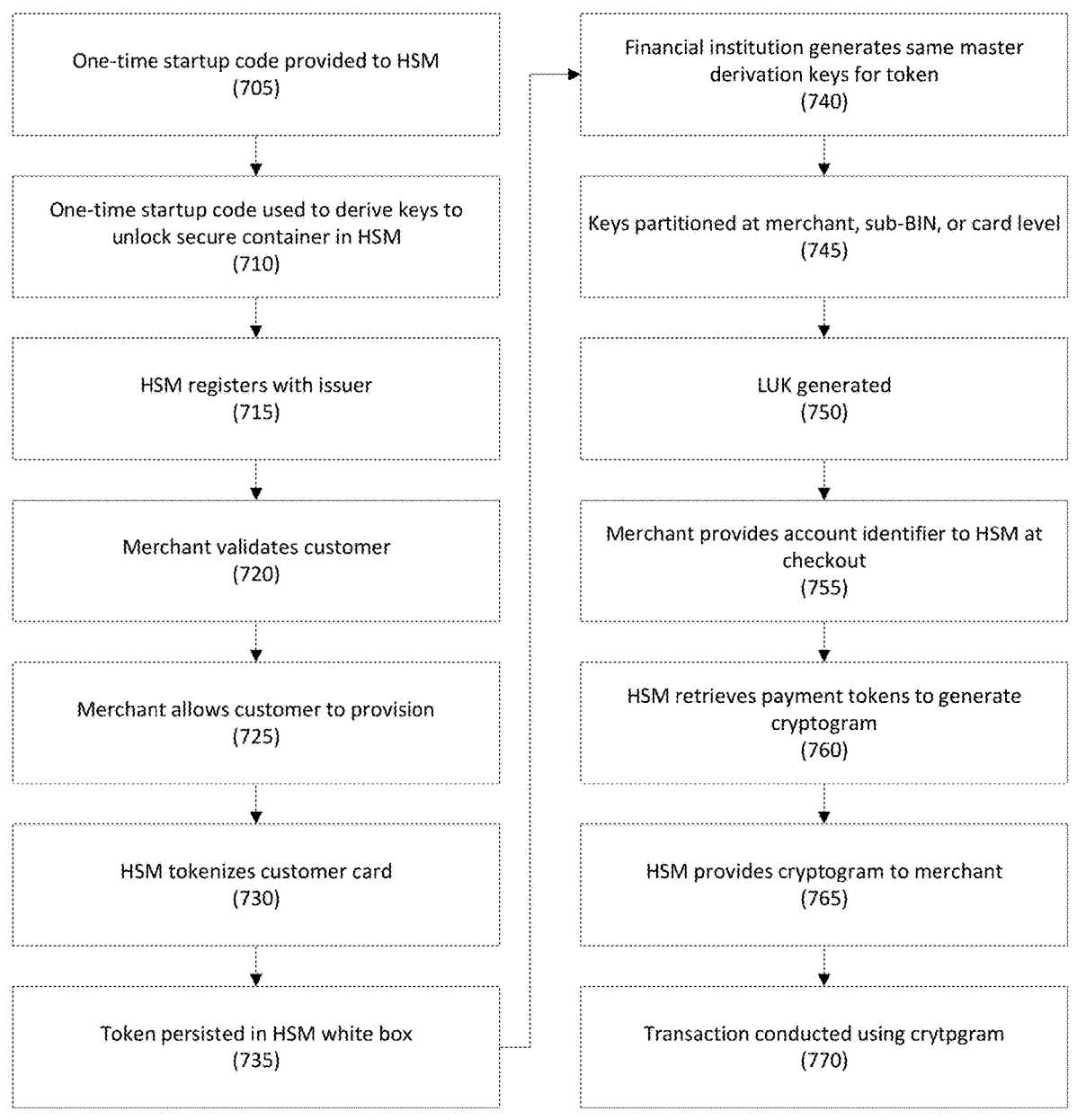

One-time startup code provided to HSM
(705)

One-time startup code used to derive keys to
unlock secure container in HSM
(710)

HSM registers with issuer
(715)

Merchant validates customer
(720)

Merchant allows customer to provision
(725)

HSM tokenizes customer card
(730)

Token persisted in HSM white box
(735)

Financial institution generates same master
derivation keys for token
(740)

Keys partitioned at merchant, sub-BIN, or card level
(745)

LUK generated
(750)

Merchant provides account identifier to HSM at
checkout
(755)

HSM retrieves payment tokens to generate
cryptogram
(760)

HSM provides cryptogram to merchant
(765)

Transaction conducted using crytpgram
(770)

FIGURE 7

SYSTEMS AND METHODS FOR USING A CRYPTOGRAM LOCKBOX

RELATED APPLICATIONS

This application is a Continuation of U.S. patent application Ser. No. 16/432,623, now U.S. Pat. No. 12,008,548, filed Jun. 5, 2019, which claims the benefit of and priority to U.S. Provisional Patent Application Ser. No. 62/680,674, filed Jun. 5, 2018, the disclosure of each which is hereby incorporated by reference in its entirety.

BACKGROUND OF THE INVENTION

1. Field of the Invention

The present disclosure generally relates to systems and methods for using a cryptogram lockbox.

2. Description of the Related Art

Cryptograms are used in the authorization of credit card-based transactions. A cryptogram is a one-time code that is unique to a transaction. It is required to submit an authorization request to an issuer. Cryptograms are associated with a financial instrument, and are generated from a key.

In general, to authorize a transaction, a merchant backend requests a cryptogram from a cryptogram issuer via the issuer backend, and, after receiving the cryptogram, sends the transaction authorization request with the cryptogram to the merchant's acquirer. The issuer then receives the cryptogram to authenticate the card and authorize the transaction.

SUMMARY OF THE INVENTION

Systems and methods for using a cryptogram lockbox are disclosed. In one embodiment, in an information processing apparatus comprising at least one computer processor, a method for activating a cryptogram lockbox may include: (1) providing a merchant-specific cryptogram lockbox to merchant, wherein the cryptogram lockbox generates a cryptogram for a transaction locally; (2) providing the merchant with a startup code; (3) receiving an activation call from the cryptogram lockbox, herein the activation call comprises the startup code; (4) receiving lockbox metadata from the cryptogram lockbox; (5) providing the cryptogram lockbox with an API secret for API calls; and (6) establishing a secure communication channel with the cryptogram lockbox.

In one embodiment, the startup code may be provided out-of-band.

In one embodiment, communication keys may encrypt communications between the cryptogram lockbox information processing apparatus.

In one embodiment, the communications keys may be rotated.

In one embodiment, the cryptogram lockbox may implemented in hardware and/or software.

In one embodiment, the lockbox metadata may include a lockbox identifier, a lockbox location, and a merchant identifier.

According to another embodiment, in an information processing apparatus comprising at least one computer processor, a method for provisioning a cryptogram lockbox may include: (1) receiving a token reference identifier for an account from a merchant backend; (2) requesting a token associated with the account and at least one limited use key from an issuing financial institution; (3) receiving, from the issuing financial institution, the token, a token expiration date, and at least one limited use key; and (4) storing the token number, the expiration date, and the at least one limited use key.

In one embodiment, the method may further include refreshing the at least one limited use key.

In one embodiment, the limited use key may be refreshed based on at least one of a number of transactions, a dollar amount of transactions, and a time in use for the limited use key.

In one embodiment, the issuing financial institution may specify when the at least one limited use key is updated.

In one embodiment, the method may further include informing the issuing financial institution that the at least one limited use key was refreshed.

According to another embodiment, in a merchant-specific cryptogram lockbox comprising at least one computer processor, a method for generating a cryptogram locally using a cryptogram lockbox may include: (1) receiving, from merchant backend, a request for a cryptogram comprising an account identifier received from a customer in a transaction; (2) generating a cryptogram for the account identifier using a limited use key for the account identifier; and (3) returning the cryptogram to the merchant backend. The merchant may conduct the transaction using the cryptogram.

In one embodiment, the cryptogram lockbox may be implemented in hardware and/or software.

In one embodiment, the limited use key that is used to generate the cryptogram may be selected from a plurality of limited use keys stored by the cryptogram lockbox.

In one embodiment, the account identifier may include a token reference identifier.

In one embodiment, the method may further include sending a ping to the issuing financial institution; and initiating a self-destruction routine in response to an unsuccessful ping.

In one embodiment, the method may further include sending a ping to the issuing financial institution; and receiving a limited key refresh from the issuing financial institution.

BRIEF DESCRIPTION OF THE DRAWINGS

For a more complete understanding of the present invention, the objects and advantages thereof, reference is now made to the following descriptions taken in connection with the accompanying drawings in which:

FIG. 3 depicts a method for provisioning a cryptogram lockbox according to one embodiment;

FIG. 7 depicts a method for using a cryptogram lockbox according to another embodiment.

DETAILED DESCRIPTION OF PREFERRED EMBODIMENTS

Embodiments are directed to systems and methods for using a cryptogram lockbox.

In embodiments, a cryptogram lockbox may be based on hardware and/or software, and may be co-located in a merchant's data center, in the merchant's cloud, etc. It may be used to generate cryptograms locally using, for example, unique merchant account keys, rather than requesting a cryptogram from a payment network (e.g., Visa) or a card issuer.

In embodiments, the cryptogram lockbox is secure and may be isolated from external interactions. For example, any direct external connectivity may be blocked by the merchant.

In one embodiment, the cryptogram lockbox may generate cryptograms for a range of product offerings.

In one embodiment, the cryptogram lockbox may dynamically provision the keys related to a customer's account, and may dynamically update and/or invalidate the keys related to a customer's account. It may be able to disable the system entirely or on a case by case basis, and may support rotation of all system-related keys. In one embodiment, APIs may be used to retrieve a cryptogram from the system. The cryptogram lockbox may support bulk loading of existing cards/tokens on file.

The cryptogram lockbox may provide support for life cycle events, including provisioning, lost/stolen updates, chargeback/disputes, reissue updates (including natural and forced), newly issued card, updates due to issuer account takeover (ATO), updates due to merchant/wallet ATO, key rotation, merchant account closure, issuer account closure, etc.

In one embodiment, a cryptogram issuer (e.g., Visa) and the financial institution may have the same keys that are used to derive subordinate keys. The financial institution may provide the cryptogram lockbox so that the merchant can generate the cryptograms locally with no dependencies.

In one embodiment, the cryptogram lockbox may be secured using, for example, a root detection, or compromise detection, policy (e.g., Zymperium, InAuth, etc.), hardware security module(s), an ephemeral approach, code obfuscation, with box cryptography, etc.

In one embodiment, the cryptogram lockbox may include an API secret, token information (e.g., DPAN, expiration date, etc.), limited use keys (LUK), configurations (e.g., settings, frequency of calls, etc.), SSL keys, code, digital signature keys, etc.

Figure 1:
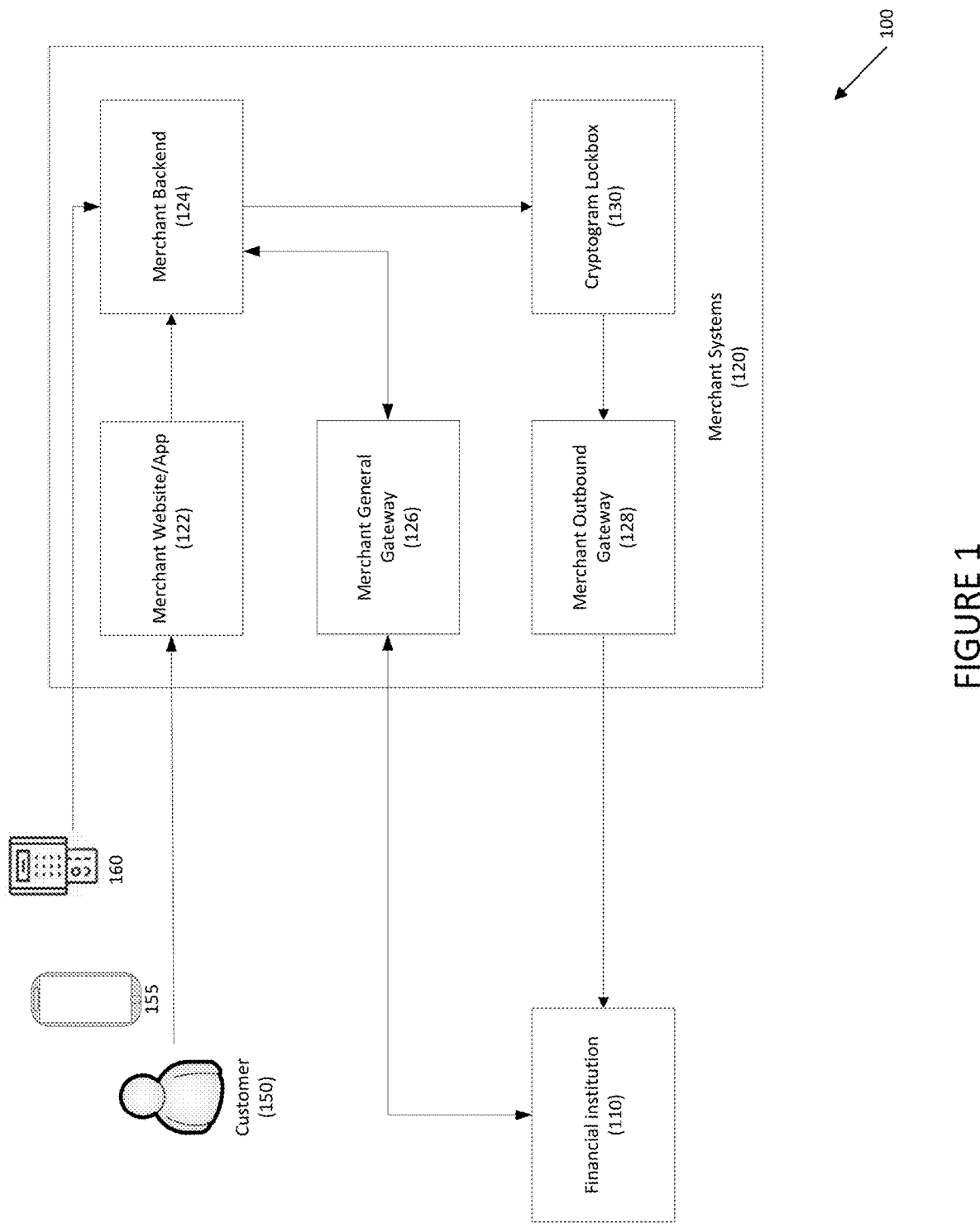
FIG. 1 depicts a cryptogram lockbox system according to one embodiment.

Referring to FIG. 1, a cryptogram lockbox system is disclosed according to one embodiment. System 100 may include financial institution 110, which may be a credit card issuer, and merchant systems 120 which may provide backend processing for a merchant (e.g., on-line merchant, brick-and-mortar merchant, etc.).

Merchant systems 120 may further include merchant website or application 122, merchant backend 124, merchant general gateway 126, merchant outbound gateway 128, and cryptogram lockbox 130.

In one embodiment, merchant may provide point of sale terminal 160, which may communicate with merchant backend 124.

Customer 150 may interact with merchant systems 120 directly at a point of sale device (not shown), or at merchant website or application 122 using electronic device 155. Electronic device 155 may be any suitable electronic device, including smartphones, smart watches, computers (e.g., notebook, desktop, tablet, etc.), Internet of Things (IOT) appliances, kiosks, ATMs, etc.

Merchant outbound gateway 128 may provide an interface for merchant systems 120 to communicate outside the merchant.

Cryptogram lockbox 130 may be implemented in hardware or in software. In one embodiment, cryptogram lockbox 130 may be configured to communicate with two internal end-points—merchant outbound gateway 128 for traffic outside the merchant, and merchant backend 124 for traffic internal to the merchant. In one embodiment, IP whitelisting, two-way SSL, or similar techniques may be used to secure the communication internally and externally between all parties.

Figure 2:
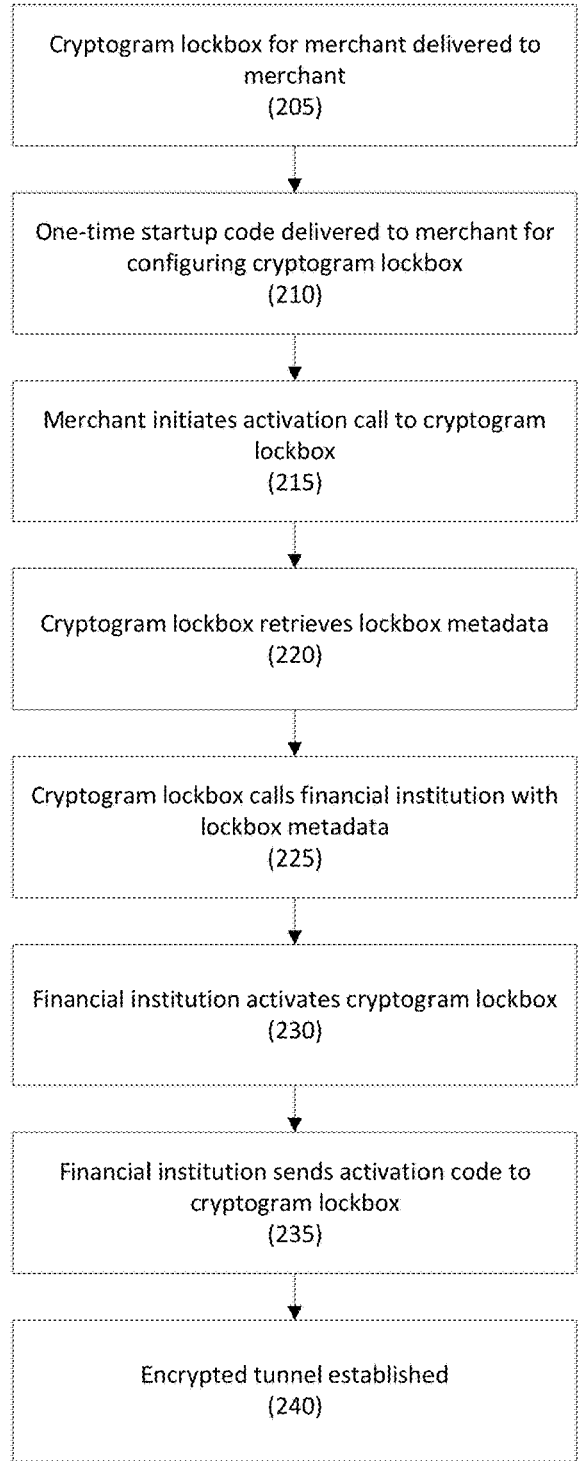
FIG. 2 depicts a method for activation of a cryptogram lockbox according to one embodiment.

Referring to FIG. 2, a method for cryptogram lockbox activation is provided according to one embodiment. First, in step 205, a cryptogram lockbox that is specific for a merchant may be delivered to a merchant. The cryptogram lockbox may be hardware, software, a combination thereon, provided in the cloud, etc.

In step 210, a one-time startup code may be delivered, for example, out-of-band, to the merchant to be configured into the cryptogram lockbox. In one embodiment, the one-time startup code may be delivered out-of-band or by other secure communication.

In one embodiment, the one-time startup code may be a key having a unique value that authorizes the merchant to use the cryptogram lockbox.

In step 215, the merchant may initiate an activation call to the cryptogram lockbox. In one embodiment, the merchant may communicate the one-time activation code to the cryptogram lockbox.

In step 220, the cryptogram lockbox may initiate an activation process with the financial institution, and may retrieve lockbox metadata, such as the lockbox ID, physical address, North American Industry Classification System (NAICS) code, business name, datacenter address, lockbox unique identifiers, IP address information of the lockbox, etc.

In step 225, the cryptogram lockbox may initiate an activation call to the financial institution. It one embodiment, the activation may include the lockbox metadata collected in step 220, above, and any other information as is necessary and/or desired.

In one embodiment, cryptogram lockbox may use the one-time startup code as a SALT, and may use the financial institution's public key to encrypt the first call out to the financial institution. In one embodiment, this call may use two-factor authentication.

In one embodiment, the SALT may be used to generate a set of encryption keys that may be unique to the installation of the cryptogram lockbox at the merchant.

In step 230, the financial institution may activate the cryptogram lockbox, and in step 235, may send an activation code (e.g., an API secret) that may be used for subsequent API calls to the cryptogram lockbox.

Once the cryptogram lockbox and the financial institution are connected, the one-time code may be invalidated, and the cryptogram lockbox may retrieve an encrypted set of communications. If there is already a two-way SSL established between the cryptogram lockbox and the financial institution, this may not be necessary.

In step 240, if an encrypted tunnel is desired within SSL, a key exchange may be performed, and both parties may derive the necessary key to encrypt the application data units.

In one embodiment, communication keys may be used to encrypt ongoing communications between the cryptogram lockbox and the financial institution, and may be rotated as necessary and/or desired (e.g., over time, number of invocations, etc.) to ensure security.

In one embodiment, local storage may be encrypted using an encryption key retrieved from the financial institution using the communication keys. In one embodiment, the encryption key may be retrieved in real-time. If the encryption key cannot be retrieved, the system may be locked until the encryption key can be retrieved, or the setup is performed again.

Referring to FIG. 3, a method for provisioning a cryptogram lockbox is disclosed according to one embodiment.

In step 305, the cryptogram lockbox may be provisioned. For example, the customer may go through an identification process, such as OAUTH 2.0. Once the customer is identified, the financial institution may send the merchant one or more account identifiers for the customer, which may include a unique account identifier for the given merchant. The merchant may provide this account identifier to the cryptogram lockbox, which will acknowledge the request.

In one embodiment, the financial institution may provide a token reference identifier to the merchant.

In step 310, the merchant may provide the identifier, such as the token reference identifier, to the cryptogram lockbox.

In step 315, the cryptogram lockbox may request the token for the identifier and other information from the financial institution. For example, the request may include the token reference identifier, and may request token metadata, limited use keys, and any other metadata (e.g., how often to refresh keys, etc.) as is necessary and/or desired.

For example, the cryptogram lockbox may send an encrypted message to the financial institution including the account identifier(s) for the customer.

In step 320, the financial institution may return the token and other requested data to the cryptogram lockbox. For example, the financial institution may collect the customer's token number, expiration date, limited use keys, and any other data necessary to create a transaction, and may provide this information in an encrypted reply.

In step 325, the cryptogram lockbox may store the encrypted account identifier(s), token number, expiration date, limited use keys, and other information.

In step 330, the cryptogram lockbox may refresh the limited use keys. In one embodiment, the refresh may be based on the number of transactions, the dollar amount of transactions, the duration of the limited use key in use, etc. Any suitable basis for refreshing the limited use key may be used as is necessary and/or desired.

In one embodiment, the basis for refreshing the limited use key may be set by the financial institution.

In step 335, the cryptogram lockbox may inform the financial institution of the refresh, and in step 340, the financial institution may refresh its limited use key.

In one embodiment, using the one-time SALT, the cryptogram lockbox may use, for example, a standard PBKDF2 to derive a local key to perform AES encryption using cipher block chaining (CBC) mode to protect this data. In one embodiment, AES>256 or any suitable white box cryptography may be used to persist this data.

Figure 4:
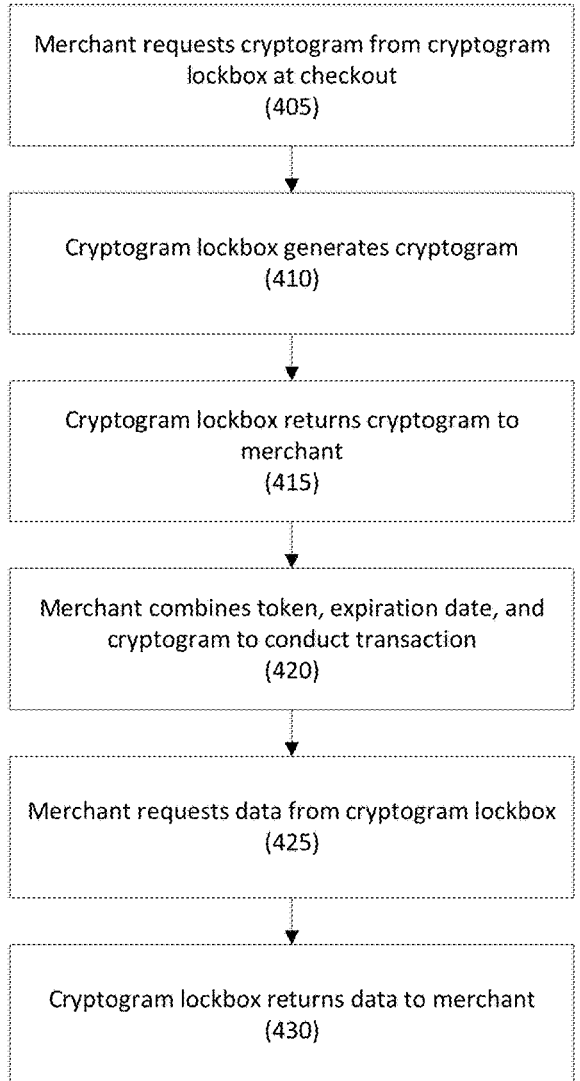
FIG. 4 depicts a method for using a cryptogram lockbox according to one embodiment.

Referring to FIG. 4, a method for using a cryptogram lockbox is disclosed according to one embodiment.

In step 405, at checkout, the merchant may request a cryptogram from the cryptogram lockbox. For example, the merchant may send the account identifier received from the customer (e.g., by credit card swipe/dip, from the EMV chip, tap, RF communication from a mobile wallet, by customer entry at a website, etc.) to the cryptogram lockbox.

In one embodiment, the account identifier may be a token; in another embodiment, the account identifier may be a credit card number.

In step 410, the cryptogram lockbox may generate a cryptogram for the account identifier. For example, the cryptogram lockbox may use the active limited use key for the token to generate the cryptogram.

In step 415, the cryptogram lockbox may return the cryptogram to the merchant, and, in step 420, may combine the token, the expiration date, and the cryptogram to conduct the transaction as a business as usual transaction.

In step 420, the merchant may request data from the cryptogram lockbox, such as metrics, monitoring information, identifying information, etc. In one embodiment, the data may be requested periodically or as necessary and/or desired.

In step 425, the cryptogram lockbox may retrieve data responsive to the request, and in step 430, may return the data to the merchant.

Figure 5:
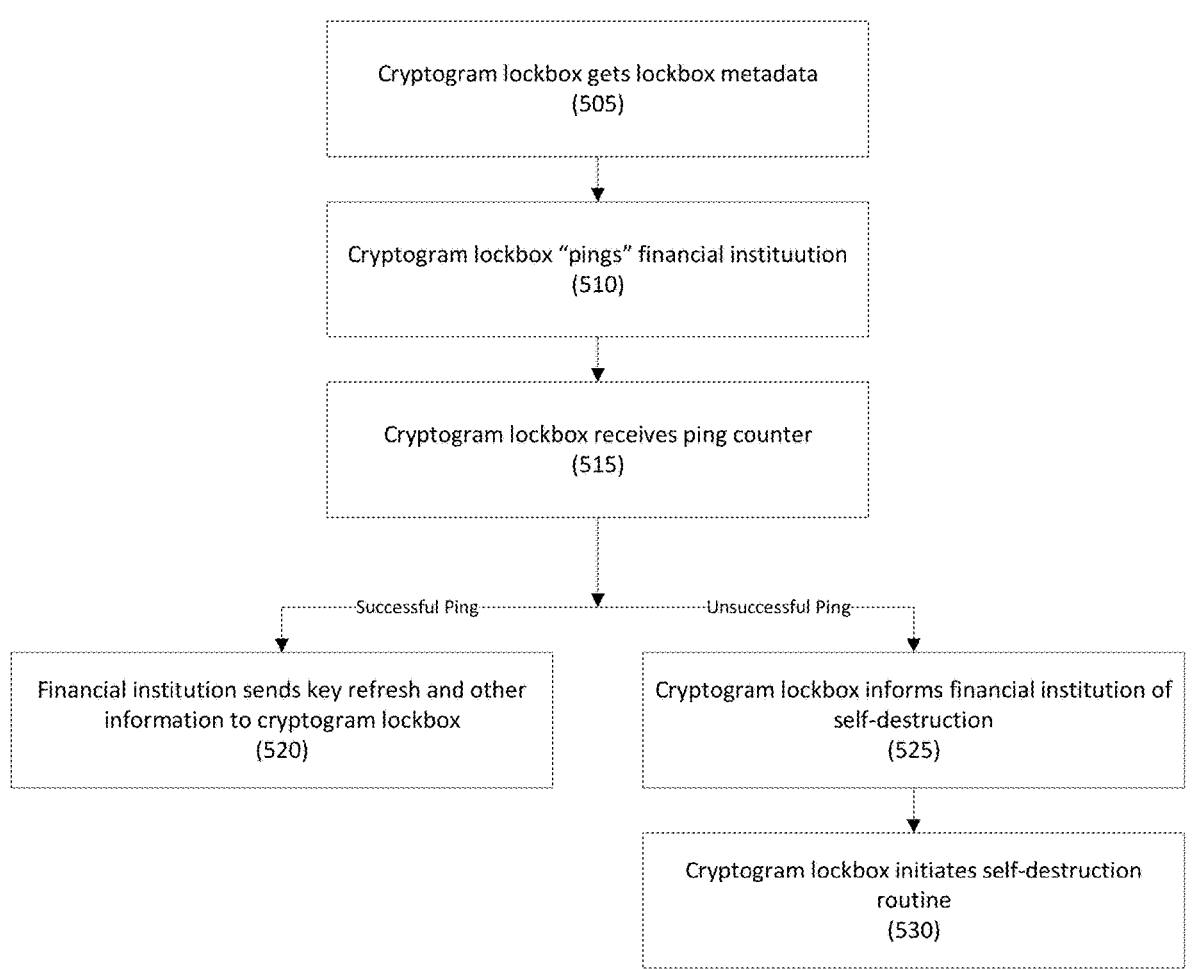
FIG. 5 depicts a method for cryptogram lockbox maintenance according to one embodiment.

Referring to FIG. 5, a method for cryptogram lockbox maintenance is disclosed according to one embodiment. In step 505, the cryptogram lockbox may retrieve lockbox metadata, such as the lockbox ID, physical address, North American Industry Classification System (NAICS) code, business name, datacenter address, lockbox unique identifiers, IP address information of the lockbox, etc., and any other information as is necessary and/or desired.

In step 510, the cryptogram lockbox may send a transmission to its financial institution. In one embodiment, the cryptogram lockbox may send a transmission (e.g., a "ping") to any other suitable entity, website, etc. The frequency of the transmissions may be set by the financial institution to be periodic, upon the occurrence of certain events (e.g., refresh, maintenance, tampering, etc.), or as otherwise necessary and/or desired.

In step 515, the cryptogram lockbox may receive a responsive communication from the financial institution or other entity. If the transmission was successful, in step 520, the financial institution may send a key refresh and other data to the cryptogram lockbox.

If the transmission was not successful, in step 525, the cryptogram lockbox may inform the financial institution that it will self-destruct. This may be an asynchronous transmission. Next, in step 530, the cryptogram lockbox may initiate the self-destruction routine, and may delete its assets, such as the API secret, tokens, configuration data, SSL keys, database, etc.

In one embodiment, the self-destruction routine may be initiated if tampering (e.g., hardware or software) is sensed, etc.

In one embodiment, the cryptogram lockbox may handle life-cycle or other account events. For example, if the financial institution detects an account change (e.g., lost stolen card, reissue card, key rotation, etc.), the merchant account specific account identifier(s) may be provided to the merchant gateway, and the merchant may send the account identifiers to the cryptogram lockbox using, for example, a cryptogram lockbox change API. The cryptogram lockbox may use the account identifiers to contact the financial institution to determine what has changed, and the cryptogram lockbox may update its data.

Once updated, the cryptogram lockbox may inform the financial institution, which may send information (e.g., new token, expiration date, etc.) to the merchant gateway. In one embodiment, the financial institution may not send keys or secure items to the lockbox through the merchant gateway.

If the merchant detects a change in the token or other account identifier, a similar process may be used except the merchant may provide the cryptogram lockbox with a unique id (e.g., a GUID) that may be sent to the financial institution, and the financial institution may request details about the change from the merchant. The financial institution may return any account identifiers to the merchant for the cryptogram lockbox to update the cryptogram lockbox.

Figure 6:
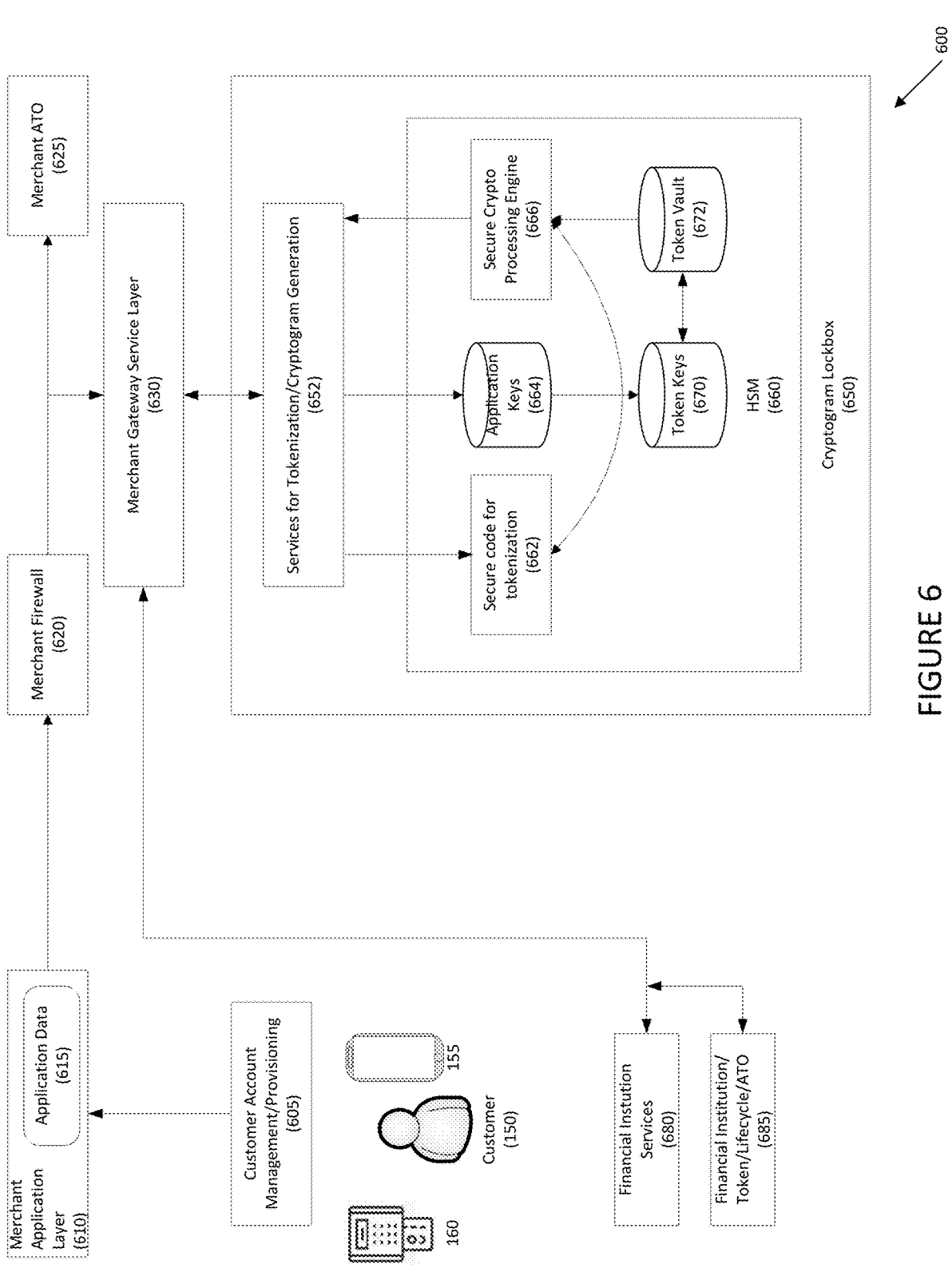
FIG. 6 depicts a cryptogram lockbox system according to another embodiment.

Referring to FIG. 6, hardware-based cryptogram lockbox 650 is provided according to one embodiment. In one embodiment, hardware security module (HSM) 660 may be extended to include tokenization, secure storage, and cryptogram generating capabilities. In one embodiment, point of sale device 160 may receive a transaction from customer 150.

In one embodiment, HSM 660 may include secure code for tokenization and cryptogram generation 662, which may be executed by secure crypto processing engine 666 to generate cryptograms. It may further include second set of master keys 664 from the financial institution for the generation of the limited use key. In one embodiment, second set of master keys 664 may be merchant-specific, and may be shared with the financial institution and the payment network provider. For example, HSM 660 may include algorithms that derive the same Master Derivation Keys (MDK) as the financial institution given the same account identifier and sub Bank Identification Number (BIN) range. Thus, the MDK does not have to be transmitted over the air to the financial institution.

In one embodiment, the merchant may expose gateway service API layer 630 for communication to outside the merchant that may wrap around the built-in services within HSM 660 for provisioning/startup/life cycle event processing.

In one embodiment, merchant gateway service API layer 630 may have a dedicated internal connection, and HSM 660 may talk only to these whitelisted devices.

Merchant gateway service layer 630 may communicate with HSM 660 via services for tokenization/cryptogram generation 652.

In one embodiment, HSM 660 may include token key storage 670 for storing token keys, token vault 672 for storing tokens, secure code for tokenization 662 which may generate tokens.

In one embodiment, customer account management/provisioning may provide an enrollment process where customer 150 establishes a relationship of their credential to the merchant/wallet and creates a token.

Merchant application layer 610 may store account information, such as a merchant wallet. Application data 615 may store customer information such as the merchant wallet id, token number, account numbers, customer name, customer address, customer preferences, etc.

Financial institution services 680 and financial institution token/lifecycle/ATO 685 may provide token-related services for the financial institution.

Referring to FIG. 7, a method for initializing a hardware-based cryptogram lockbox is provided according to one embodiment.

In step 705, at startup, a one-time startup code may be provided to the HSM. For example, out-of-band authentication may be used, as may the HSM's hardware serial number. For example, a one-time startup code may be provided by the owner of the cryptogram lockbox (e.g., an issuing financial institution) and may be delivered verbally, via secure email, through a secure system that may be leveraged (e.g., a payment network associated with the cryptogram lockbox, etc.).

In step 710, when the HSM is configured, the startup code may be used to derive the keys necessary to unlock a secure container within the HSM. For example, the startup code may provide the keying material to setup the internal white box that may store all the keys, parameters, etc. that are necessary to identify a provisioned token, generate a cryptogram, etc.

In step 715, the HSM may register with the financial institution using the PKI included in the hardware by the financial institution.

In step 720, during token provisioning, the merchant may validate the customer using merchant systems. For example, token provisioning may be initiated when the customer provides the merchant with account information. At that point, the merchant can initiate the provisioning flow to create a token.

Once the merchant has done so, in step 725, the merchant may allow the customer to provision a card, by invoking specific service designed for the same exposed via the merchant service API layer.

In step 730, the HSM may tokenize the customer's card after receiving successful validation from the financial institution. In step 435, the token may then be persisted within the HSM white box.

In step 740, parallel algorithms on the financial institution side may generate the same master derivation keys for the token, so that these keys are never transmitted over the air.

In step 745, the keys may be partitioned at the merchant or sub-BIN or card level in order to increase security. For example, a first merchant may be provided with a first set of keys, and a second merchant (e.g., a different Token Reference Identifier (TRI), a different Merchant ID, etc.) may receive a different key for the same account. This may also be done at the BIN level so that the keys may be assigned using some or all of the digits on the card (e.g., the first 4 digits of the card up to the entire card number).

In another embodiment, the financial institution may receive a BIN range from a payment network (e.g., VISA), they may be sub divided across merchants, and may be hard coded into the HSM. When a provisioning request comes through, the HSM may randomly pick a bin and may derive the MDK. The selected bin may be communicated to financial institution so that the financial institution may derive the same MDK.

In step 750, a limited use key, or limited use key, may be generated. In one embodiment, the generation of the limited use key from MDK may be periodic. If the existing limited use key is valid, it may be used to generate the cryptogram, and the Application Transaction Counter (ATC) may be incremented. The limited use key may have expiration conditions (e.g., a life cycle event); when one of those are met, a new limited use key may be derived, for example, from the same MDK.

In step 755, when payment is requested at checkout, the merchant may provide the account identifier to the HSM, which, in step 460, may retrieve the necessary payment tokens to generate a cryptogram. In step 465, the HSM may then provide the cryptogram back to the merchant, and in step 470, the transaction may be conducted as a business as usual transaction.

Although several embodiments are disclosed, it should be recognized that these embodiments are not mutually exclusive, and features from one embodiment may be used with other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an Open-Step™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for activating a merchant-specific cryptogram lockbox, comprising:

receiving, by a merchant backend for a merchant in a physical merchant datacenter and from a financial institution backend and using a merchant general gateway, a startup code comprising a unique value that authorizes use of a merchant-specific cryptogram lockbox by the merchant, the merchant backend in communication with a plurality of merchant point of sale devices and wherein the merchant-specific cryptogram lockbox generates cryptograms for the plurality of merchant point of sale devices;

communicating, by the merchant backend, the startup code to the merchant-specific cryptogram lockbox;

calling, by the merchant-specific cryptogram lockbox in the physical merchant datacenter and using a merchant outbound gateway, the financial institution backend with the startup code and cryptogram lockbox metadata for the merchant-specific cryptogram lockbox;

establishing, by the merchant-specific cryptogram lockbox, a secure communication channel with the financial institution backend, wherein the secure communication channel uses IP whitelisting;

receiving, by the merchant-specific cryptogram lockbox, limited use keys from the financial institution backend over the secure communication channel;

receiving, by the merchant-specific cryptogram lockbox and from one of the plurality of merchant point of sale devices, a call comprising a request for a cryptogram and a payment token for an account in a transaction;

generating, by the merchant-specific cryptogram lockbox, the cryptogram for the payment token using the limited use keys;

returning, by the merchant-specific cryptogram lockbox, the cryptogram to the merchant backend; and conducting, by the merchant backend, the transaction with the cryptogram and the payment token.

2. The method of claim 1, wherein the startup code is provided out-of-band.

3. The method of claim 1, wherein the merchant-specific cryptogram lockbox is implemented in hardware and comprises a secure cryptogram processing engine.

4. The method of claim 1, wherein the merchant-specific cryptogram lockbox is implemented in software.

5. The method of claim 1, wherein the cryptogram lockbox metadata comprises at least one of a merchant-specific cryptogram lockbox identifier, a merchant-specific cryptogram lockbox location, and a merchant identifier.

6. A system, comprising:

a plurality of merchant point of sale devices;

a merchant datacenter comprising:

a merchant-specific cryptogram lockbox executing a lockbox computer program, wherein the merchant-specific cryptogram lockbox generates cryptograms for a plurality of merchant point of sale devices;

a merchant backend in communication with a plurality of merchant point of sale devices;

a merchant general gateway; and a merchant outbound gateway; and a financial institution backend;

wherein:

the financial institution backend provides a startup code comprising a unique value that authorizes use of the merchant-specific cryptogram lockbox by a merchant to the merchant backend using the merchant general gateway;

the merchant backend communicates the startup code to the merchant-specific cryptogram lockbox;

the lockbox computer program calls the financial institution backend with the startup code and cryptogram lockbox metadata for the merchant-specific cryptogram lockbox using the merchant outbound gateway;

the lockbox computer program establishes a secure communication channel with the financial institution backend, wherein the secure communication channel uses IP whitelisting;

the merchant-specific cryptogram lockbox receives limited use keys from the financial institution backend over the secure communication channel;

the merchant-specific cryptogram lockbox receives a call comprising a request for a cryptogram and a payment token for an account in a transaction from one of the plurality of merchant point of sale devices;

the merchant-specific cryptogram lockbox generates the cryptogram for the payment token using the limited use keys;

the merchant-specific cryptogram lockbox returns the cryptogram to a merchant backend; and the merchant backend conducts the transaction with the cryptogram and the payment token.

7. The system of claim 6, wherein the startup code is provided out-of-band.

8. The system of claim 6, wherein the merchant-specific cryptogram lockbox is implemented in hardware and comprises a secure cryptogram processing engine.

9. The system of claim 6, wherein the merchant-specific cryptogram lockbox is implemented in software.

10. The system of claim 6, wherein the cryptogram lockbox metadata comprises at least one of a merchant-specific cryptogram lockbox identifier, a merchant-specific cryptogram lockbox location, and a merchant identifier.

11. A non-transitory computer readable storage medium, including instructions stored thereon, which when read and executed by one or more computer processors, cause the one or more computer processors to perform steps comprising:

receiving a startup code comprising a unique value that authorizes use of a merchant-specific cryptogram lockbox by a merchant from a financial institution backend via a merchant general gateway, wherein the merchant-specific cryptogram lockbox generates cryptograms for a plurality of merchant point of sale devices;

calling the financial institution backend with the startup code and cryptogram lockbox metadata for the merchant-specific cryptogram lockbox using a merchant outbound gateway;

establishing a secure communication channel with the financial institution backend, wherein the secure communication channel uses IP whitelisting;

receiving, by the merchant-specific cryptogram lockbox, limited use keys from the financial institution backend over the secure communication channel;

receiving, from one of a plurality of merchant point of sale devices, a call comprising a request for a cryptogram and a payment token for an account in a transaction;

generating the cryptogram for the payment token using the limited use keys; and conducting the transaction with the cryptogram and the payment token.

12. The non-transitory computer readable storage medium of claim 11, wherein the startup code is provided out-of-band.

13. The non-transitory computer readable storage medium of claim 11, wherein the merchant-specific cryptogram lockbox is implemented in hardware and comprises a secure cryptogram processing engine.

14. The non-transitory computer readable storage medium of claim 11, wherein the cryptogram lockbox metadata comprises at least one of a merchant-specific cryptogram lockbox identifier, a merchant-specific cryptogram lockbox location, and a merchant identifier.

\* \* \* \* \*